(12) United States Patent
Yamagata et al.

(10) Patent No.: US 9,500,474 B2
(45) Date of Patent: Nov. 22, 2016

(54) ILLUMINATION APPARATUS, ILLUMINATION METHOD, MEASURING APPARATUS, AND MEASURING METHOD

(71) Applicant: MITUTOYO CORPORATION, Kanagawa-ken (JP)

(72) Inventors: Masaoki Yamagata, Kanagawa-ken (JP); Kentaro Nemoto, Kanagawa-ken (JP); Toshihisa Takai, Kanagawa-ken (JP); Tadashi Iwamoto, Tokyo (JP)

(73) Assignee: MITUTOYO CORPORATION, Kanagawa-Ken (JP)

( * ) Notice: Subject to any disclaimer, the term of this patent is extended or adjusted under 35 U.S.C. 154(b) by 191 days.

(21) Appl. No.: 14/601,280

(22) Filed: Jan. 21, 2015

(65) Prior Publication Data

US 2015/0211842 A1    Jul. 30, 2015

(30) Foreign Application Priority Data

Jan. 30, 2014   (JP) ................. 2014-015255

(51) Int. Cl.
*G01B 11/24*       (2006.01)
*G01B 11/25*       (2006.01)

(52) U.S. Cl.
CPC ............ *G01B 11/24* (2013.01); *G01B 11/25* (2013.01)

(58) Field of Classification Search
None
See application file for complete search history.

(56) References Cited

U.S. PATENT DOCUMENTS

2009/0205088 A1    8/2009  Crampton et al.
2013/0083384 A1*   4/2013  Yamagata ............. G01B 11/24
                                                         359/227

FOREIGN PATENT DOCUMENTS

JP          2009-534969            9/2009

* cited by examiner

*Primary Examiner* — Kara E Geisel
*Assistant Examiner* — Amanda Merlino
(74) *Attorney, Agent, or Firm* — Greenblum & Bernstein, P.L.C.

(57) ABSTRACT

An illumination apparatus according to the present invention includes a light source, a reflecting mirror, an optical system, and a calculator. The reflecting mirror includes a first reflector and a second reflector, and is capable, while changing a reflection angle, of reflecting and directing at an object a first divided light, the first divided light being a portion of light from the light source emitted at the first reflector. The optical system divides the light from the light source into the first divided light and a second divided light, and guides the second divided light to the second reflector. The calculator is capable of calculating the reflection angle of the reflecting mirror by receiving the second divided light reflected by the second reflector.

11 Claims, 6 Drawing Sheets

ILLUMINATION APPARATUS, ILLUMINATION METHOD, MEASURING APPARATUS, AND MEASURING METHOD

CROSS-REFERENCE TO RELATED APPLICATIONS

The present application claims priority under 35 U.S.C. §119 of Japanese Application No. 2014-015255, filed on Jan. 30, 2014, the disclosure of which is expressly incorporated by reference herein in its entirety.

BACKGROUND OF THE INVENTION

1. Field of the Invention

The present invention relates to an illumination apparatus and illumination method capable of emitting light at an object, and also relates to a measuring apparatus and measuring method capable of measuring a shape of the object, for example.

2. Description of Related Art

Conventionally, a non-contact optical probe is known which obtains position coordinates or the like of various portions of a measured object (work piece) by emitting laser light at the work piece and detecting the light reflected off a surface of the work piece (see, e.g., Japanese Publication of PCT International Application No. 2009-534969).

Examples of a non-contact optical probe include a line-type optical probe and a flying spot-type optical probe. In the line-type optical probe, laser light emitted from a laser light source is given a line shape by a beam expander or the like, then is fired at a work piece. A shape of the work piece is measured by capturing an image of the line-shaped light fired at the work piece.

The flying spot-type optical probe uses a reflecting mirror such as a galvano-mirror, provided so as to be capable of rotation. The laser light emitted from the laser light source strikes the reflecting mirror, then the point-shaped light (point laser) reflected by the reflecting mirror is launched (i.e., directed) at the work piece. At this point, the reflecting mirror is rotationally driven relative to the incident light and the point-shaped light scans over the work piece so as to trace a line shape in accordance with the rotational driving of the reflecting mirror. The shape of the work piece is measured by capturing an image of the point-shaped light scanning over the work piece.

In the flying spot-type measuring apparatus described above, the position (shape) of the work piece is calculated using principles of triangulation, based on the rotation angle of the reflecting mirror. Accordingly, in order to achieve high accuracy with the measuring apparatus, the issue of whether the rotation angle of the reflecting mirror is measured accurately is an important one.

For example, in order to detect the rotation angle of the reflecting mirror, a rotary encoder or the like could be attached to the motor rotationally driving the reflecting mirror. However, in such a case, the rotary encoder would add a load to the motor and high-speed scanning of the laser light over the work piece would become difficult. In addition, the motor would be larger due to a requirement for adequate rotational torque, and the measuring apparatus would be difficult to reduce in size.

SUMMARY OF THE INVENTION

In view of the above, the present invention provides an illumination apparatus, illumination method, measuring apparatus, and measuring method capable of calculating an angle of a mirror with a high degree of accuracy and with a small profile.

An illumination apparatus according to one aspect of the present invention includes a light source, a reflecting mirror, an optical system, and a calculator. The reflecting mirror includes a first reflecting portion and a second reflecting portion, and is capable, while changing a reflection angle, of reflecting and directing at an object a first divided light, the first divided light being a portion of light from the light source fired at the first reflecting portion. The optical system divides the light from the light source into the first divided light and a second divided light, and guides the second divided light to the second reflecting portion. The calculator is capable of calculating the reflection angle of the reflecting mirror by receiving the second divided light reflected by the second reflecting portion.

In the illumination apparatus, the light from the light source is divided into the first divided light and the second divided light, and the first divided light is directed at the object by the reflecting mirror. The second divided light is reflected by the second reflecting portion of the reflecting mirror and is received by the calculator. The calculator calculates the reflection angle of the reflecting mirror based on the second divided light received. By dividing the light from the light source and using one portion of the light to calculate the reflection angle in this way, the reflection angle of the reflecting mirror can be calculated with a high degree of accuracy. In addition, a rotary encoder or the like for detecting the rotation angle of the reflecting mirror becomes unnecessary, and the illumination apparatus can be made smaller.

The reflecting mirror may also direct the first divided light at the object in a linear shape. Because the reflection angle of the reflecting mirror is calculated, the shape of the object at which the first divided light has been fired in a line shape, for example, can be measured with a high degree of accuracy.

The reflecting mirror may also include a mirror rotating centered on a single axis. In such a case, the calculator may also calculate the rotation angle of the mirror. The rotation angle of the mirror can be calculated with a high degree of accuracy, and therefore the shape of the object can be measured with a high degree of accuracy.

The reflecting mirror may also include a front surface and a back surface. In such a case, the first reflecting portion may be provided to the front surface while the second reflecting portion may be provided to the back surface. Thereby, the reflection angle of the reflecting mirror can be calculated with a high degree of accuracy without affecting the emitting of the first divided light.

The first reflecting portion and the second reflecting portion may also be provided to respectively different positions on the front surface. Thereby, the reflection angle of the reflecting mirror can be calculated with a high degree of accuracy and with a simple configuration.

The optical system may also divide the first and second divided lights such that the second divided light has a lower intensity than that of the first divided light. Thereby, accuracy can be improved for shape measurement performed by emitting the first divided light.

The reflecting mirror may also be a galvano-mirror or a resonant mirror. Even in a case where either mirror is used as the reflecting mirror, the reflection angle can be calculated with a high degree of accuracy without using a rotary encoder.

The light source may also be a laser light source. A laser light source has excellent directivity and can form a smaller spot light, and therefore can more accurately define a bombardment position of the work piece. As a result, accuracy can be improved for shape measurement.

An illumination method according to another aspect of the present invention includes dividing light emitted from a light source into a first divided light and a second divided light; emitting (i.e., firing) the first divided light at a first reflecting portion on a reflecting mirror; and guiding the second divided light to a second reflecting portion on the reflecting mirror. The first divided light is fired at an object by reflecting the first divided light with the first reflecting portion while changing a reflection angle of the reflecting mirror. The reflection angle of the reflecting mirror is calculated by receiving the second divided light reflected by the second reflecting portion.

A measuring apparatus according to another aspect of the present invention includes the light source, the reflecting mirror, the optical system, the calculator, and a measurer. The measurer is capable of measuring a shape of an object based on an image obtained by capturing an image of the first divided light fired at the object and on the reflection angle calculated by the calculator.

In the measuring apparatus, the second divided light is used to calculate the reflection angle of the reflecting mirror with a high degree of accuracy. In addition, the measuring apparatus measures the shape of the object based on the image obtained by capturing an image of the first divided light fired at the object and on the reflection angle of the reflecting mirror. This enables highly accurate shape measurement. In addition, the measuring apparatus can be made smaller.

A measuring method according to another aspect of the present invention includes dividing light emitted from a light source into a first divided light and a second divided light; firing the first divided light at a first reflecting portion on a reflecting mirror; and guiding the second divided light to a second reflecting portion on the reflecting mirror. The first divided light is fired at the object by reflecting the first divided light with the first reflecting portion while changing the reflection angle of the reflecting mirror. The reflection angle of the reflecting mirror is calculated by receiving the second divided light reflected by the second reflecting portion. The shape of the object is measured based on an image obtained by capturing an image of the first divided light fired at the object and on the calculated reflection angle.

As noted above, the present invention provides an illumination apparatus, illumination method, measuring apparatus, and measuring method capable of calculating an angle of a mirror with a high degree of accuracy and with a small profile.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, an embodiment of the present invention is described with reference to the drawings.

[Configuration of Measuring Apparatus]

Figure 1:
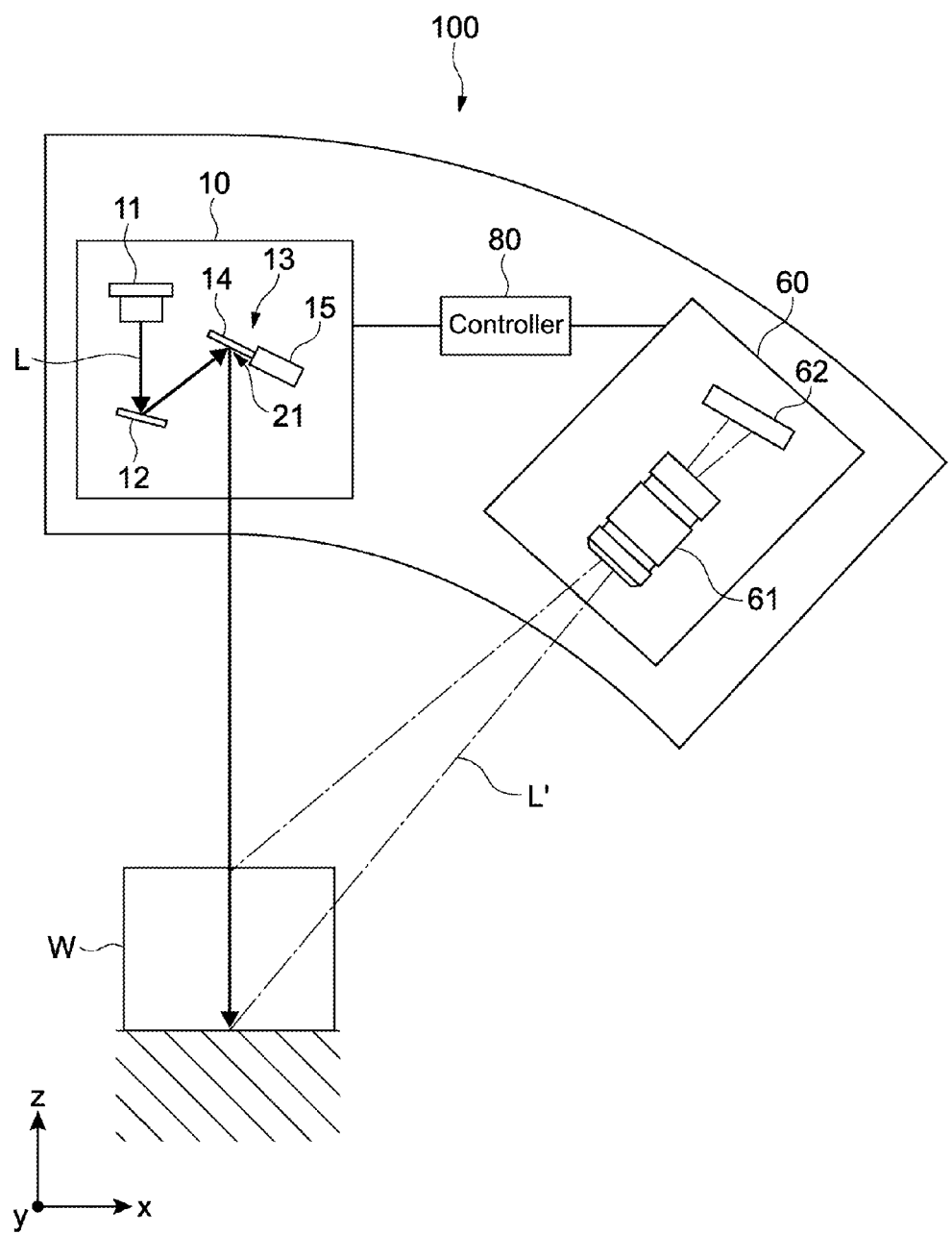
FIG. 1 is a schematic view of an exemplary configuration of an optical probe according to an embodiment of the present invention.

FIG. 1 is a schematic view of an exemplary configuration of an optical probe (exemplifying a measuring apparatus) according to a first embodiment of the present invention. An optical probe 100 according to the present embodiment is a flying spot-type optical probe scanning a surface of a work piece W (object to be measured) with a laser light L (point laser) and measuring position coordinates of each portion of the work piece W by capturing reflected light. A shape of the work piece W is measured based on the measured position coordinates.

As shown in FIG. 1, the optical probe 100 includes a light source 10, an image capturer 60, a controller 80, and an angle calculator. In the present description, basic configurations and operations of the light source 10, image capturer 60, and controller 80 are first described.

The light source 10 fires the laser light L at the work piece W. The light source 10 includes a laser light source 11 such as a laser diode (LD), a reflecting mirror 12, and a galvano-mirror 13. Other types of solid-state light source, such as an LED (light-emitting diode) may also be used as the light source firing light. Alternatively, other types of light source, such as a gas laser light source, may be used. Moreover, a wavelength band and the like of the emitted laser light L is not limited.

The reflecting mirror 12 reflects the laser light L emitted from the laser light source 11 toward the galvano-mirror 13. The laser light L from the laser light source 11 is fired at a first reflecting portion 21 of the galvano-mirror 13 by the reflecting mirror 12. A configuration of the reflecting mirror 12 is not limited and may be designed as appropriate. For example, a plurality of optical materials may be combined to configure the reflecting mirror 12.

The galvano-mirror 13 causes the laser light L reflected by the reflecting mirror 12 to scan over the work piece W. The galvano-mirror 13 includes a scanning mirror 14 and a motor 15. The scanning mirror 14 is connected to a rotary shaft of the motor 15 and, due to rotational driving by the motor 15, the scanning mirror 14 rotates. The motor 15 is controlled such that an inversion motion is repeated at a predetermined angle. In the present embodiment, the galvano-mirror 13 serves as a reflecting mirror.

By controlling a rotation angle (operation angle) of the scanning mirror 14 with the motor 15, a reflection angle relative to the laser light L is controlled. By appropriately altering the reflection angle of the scanning mirror 14, the laser light L from the laser light source 11 scans over the work piece W. In the present embodiment, the reflection angle of the scanning mirror 14 corresponds to the reflection angle of the galvano-mirror 13. Specifically, the galvano-mirror 13 is capable, while changing the reflection angle, of reflecting the laser light L fired at the first reflecting portion 21 and directing the laser light L at the work piece W.

The image capturer 60 includes a photoreceiver lens 61 and an image sensor 62. Laser light L' reflected by the surface of the work piece W passes through the photoreceiver lens 61. Laser light L1 that has passed through the photoreceiver lens 61 is incident on the image sensor 62, which is positioned on the same optical axis as the photoreceiver lens 61. Examples of the image sensor 62 may include a CMOS (Complementary Metal Oxide Semiconductor) sensor or a CCD (Charge Coupled Device) sensor.

The controller 80 includes, for example, a CPU (Central Processing Unit), a RAM (Random Access Memory), and a ROM (Read Only Memory), and is connected to, for example, the light source 10 and the image capturer 60. The CPU performs overall control of the optical probe 100 by reading various processing programs stored in the ROM, opening the programs in the RAM, and executing various processes in cooperation with the open programs.

The RAM is used as a work area of the CPU and temporarily saves input data and processing results generated when executing the processing programs, for example.

The ROM is configured by a non-volatile semiconductor memory, for example, and stores a system program capable of being executed by the CPU; various processing programs capable of being executed by the system program; data used when executing the various processing programs; and data for results of the various processes, calculated by the CPU. Moreover, the programs are stored in the ROM in the form of a programming code capable of being read by a computer.

The controller 80 is capable of measuring position coordinates (shape) of the work piece W based on an image of fired light, which is captured by the image sensor 62. In addition, the controller 80 is capable of calculating a reflection angle of the galvano-mirror 13 based on data from the angle calculator, described hereafter. In the present embodiment, the controller 80 serves as a portion of a calculator and as a measurer.

[Basic Operation of Measuring Apparatus]

Figure 2:
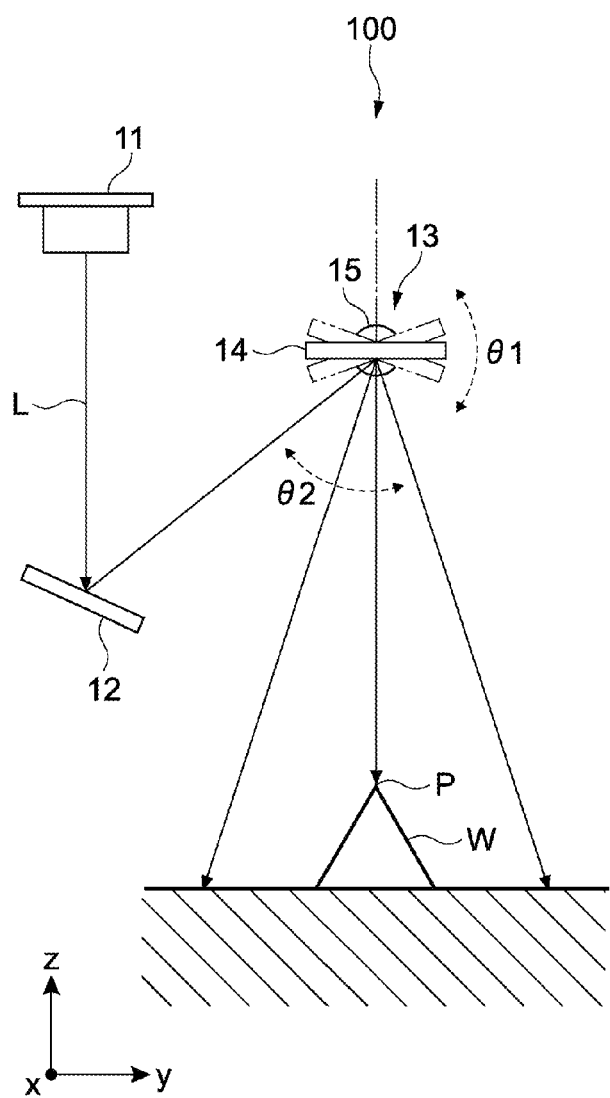
FIG. 2 is a schematic view illustrating basic operations of shape measurement using the optical probe.

FIG. 2 is a schematic view illustrating a basic operation of shape measurement using the optical probe 100. FIG. 2 is a view, from an X direction, of the work piece W being bombarded by the laser light L. Moreover, in order to facilitate understanding, in FIG. 2 an axis direction of the rotary shaft of the motor 15 is depicted as parallel to the X direction. Also, in FIG. 2, a positional relationship, for example, between the laser light source 11, the reflecting mirror 12, and the galvano-mirror 13 is changed as appropriate. In addition, the image capturer 60, for example, is not depicted in FIG. 2.

Due to the rotational drive by the motor 15 of the galvano-mirror 13, a rotation angle $\theta_1$ of the scanning mirror 14 changes. The rotation angle $\theta_1$ is calculated with a predetermined rotation position of the scanning mirror 14 as a reference. The reference rotation position may be defined as appropriate.

When the rotation angle $\theta_1$ of the scanning mirror 14 changes, a reflection angle $\theta_2$ relative to the laser light L incident on the scanning mirror 14 changes. When the reflection angle $\theta_2$ changes, a bombardment point P of the laser light L on the work piece W changes. Accordingly, by appropriately controlling the rotation angle $\theta_1$ of the scanning mirror 14, the laser light L scans over the work piece W.

In the present embodiment, the scanning mirror 14 is rotated by one motor 15 centered around one axis. The laser light L incident on the scanning mirror 14 is fired at the work piece W along a single direction in a line shape. Accordingly, the galvano-mirror 13 according to the present embodiment is capable of directing the laser light L at the work piece W in a line shape.

Figure 3:
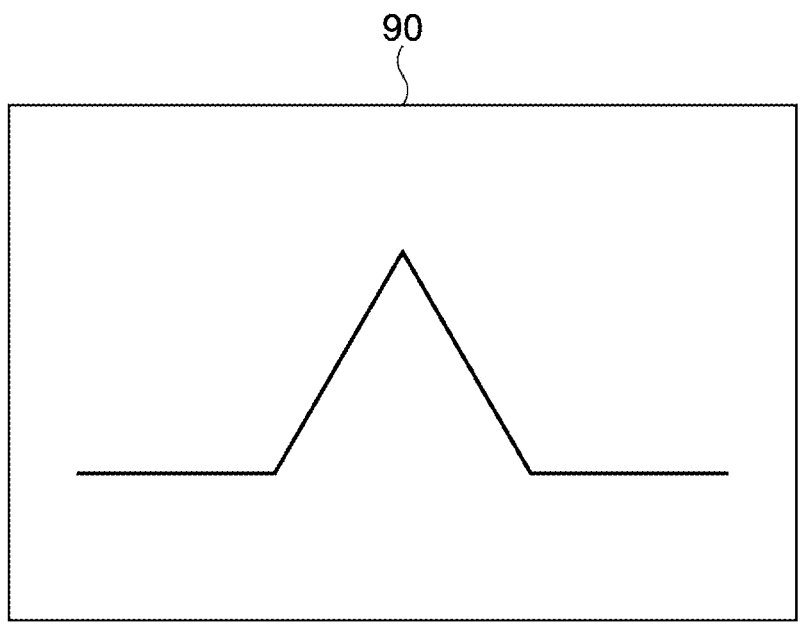
FIG. 3 illustrates an exemplary image of laser light reflected by a surface of a work piece.

The shape of the work piece W is measured using a light-section method based on principles of triangulation. An image is captured by the image capturer 60 of an area in which the scanning laser light L is fired. Then, as shown in FIG. 3, an image 90 of the laser light L fired at the surface of the work piece W is obtained. In the illustration, the image 90 of the laser light L may be referred to as an image of the work piece W.

The shape of the work piece W is measured based on the captured image of the work piece W and the data for the position of the bombardment point P during scanning of the laser light L. The position of the bombardment point P of the laser light L corresponds to the rotation angle (reflection angle) of the scanning mirror 14. Accordingly, the shape of the work piece W can be measured based on the rotation angle of the scanning mirror 14.

[Angle Calculator]

Figure 4:
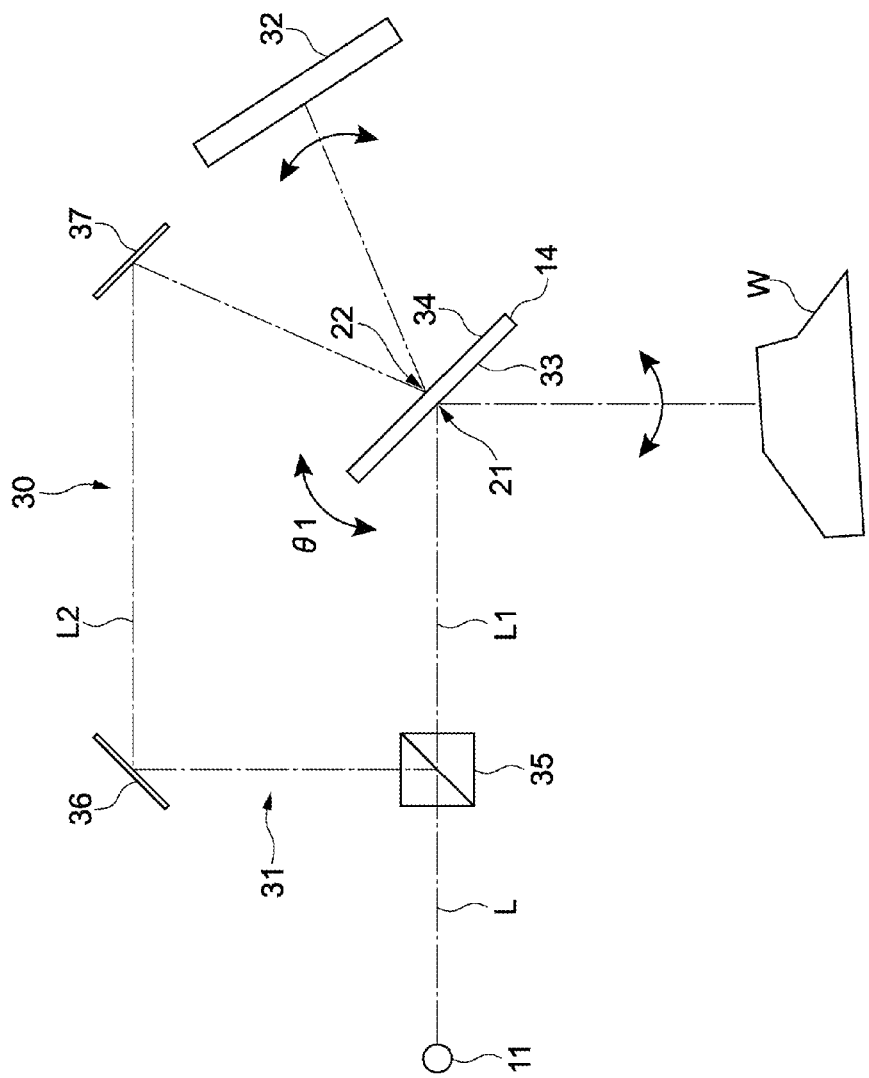
FIG. 4 is a schematic view of an exemplary configuration of an angle calculator.
Figure 5:
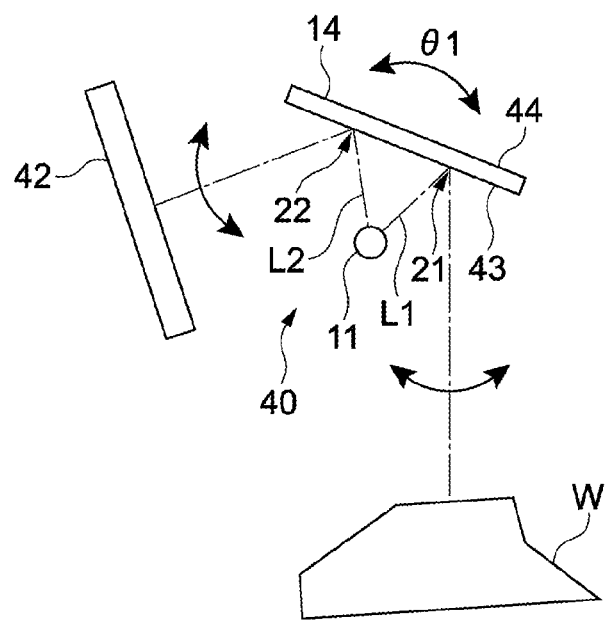
FIG. 5 is a schematic view of another exemplary configuration of an angle calculator.
Figure 6:
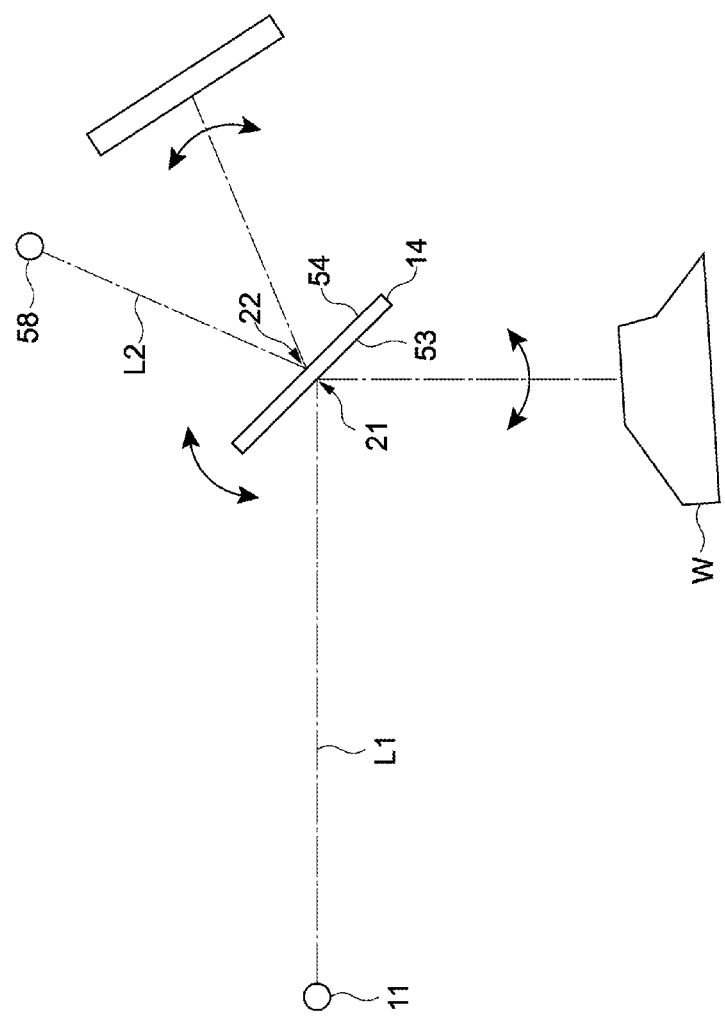
FIG. 6 is a schematic view of an exemplary configuration in a case where a dividing optical system is not used.

A description is given of an angle calculator that includes the optical probe 100. FIGS. 4 to 6 are schematic views of various exemplary configurations of an angle calculator. In FIGS. 4 to 6, a simplified configuration from the laser light source 11 to the scanning mirror 14 is depicted, while the reflecting mirror 12 shown in FIG. 1, for example, is omitted.

As shown in FIG. 4, the angle calculator 30 includes a dividing optical system 31 and a sensor 32. The dividing optical system 31 divides the laser light L emitted from the laser light source 11 into measurement light L1 and angle detection light L2, guides the measurement light L1 to a first reflecting portion 21 of the scanning mirror 14, and guides the angle detection light L2 to a second reflecting portion 22 of the scanning mirror 14. Moreover, in the present embodiment, the measurement light L1 corresponds to a first divided light, which is a portion of the laser light L from the laser light source 11. In addition, the angle detection light L2 corresponds to a second divided light, which is a portion of the laser light L from the laser light source 11.

The first reflecting portion 21 is a reflecting region defined by the scanning mirror 14 to reflect the measurement light L1 and scan over the work piece W. The second reflecting portion 22 is a reflecting region defined by the scanning mirror 14 to reflect the angle detection light L2 toward the sensor 32. The size, position, and the like of the first reflecting portion 21 and the second reflecting portion 22 may be defined as appropriate.

In the example shown in FIG. 4, a double-sided mirror is used as the scanning mirror 14. Specifically, the scanning mirror 14 includes a front surface 33 having a mirror surface capable of reflecting light and a back surface 34 likewise having a mirror surface capable of reflecting light. The first reflecting portion 21 reflecting the measurement light L1 is provided to the front surface 33, while the second reflecting portion 22 reflecting the angle detection light L2 is provided to the back surface 34. Specific configurations and materials of the scanning mirror 14 are not limited. Moreover, the front surface 33 and the back surface 34 of the scanning mirror 14 correspond to a front surface and back surface of the galvano-mirror 13 in the present embodiment.

The dividing optical system 31 includes a beam splitter 35, a first mirror 36, and a second mirror 37. The laser light L emitted from the laser light source 11 is divided into the measurement light L1 and the angle detection light L2 by the beam splitter 35. The measurement light L1 is fired at the first reflecting portion 21, while the angle detection light L2 is fired at the first mirror 36. The angle detection light L2 fired at the first mirror 36 is reflected toward the second mirror 37. Then, due to being reflected by the second mirror 37, the angle detection light L2 is directed at the second reflecting portion 22 provided to the back surface 34 of the scanning mirror 14.

A configuration of the dividing optical system 31 is not limited, nor are the optical materials employed as the dividing optical system 31 limited. In the example shown in FIG. 4, a prism-type beam splitter 35 is used; however, other types of beam splitter may also be used. The number and position of the mirrors may be designed as appropriate, as well, and other optical materials may be used. In addition, the dividing optical system 31 may be positioned between the reflecting mirror 12 shown in FIG. 1 and the laser light source 11, or may be positioned between the reflecting mirror 12 and the galvano-mirror 13.

The angle detection light L2 fired at the second reflecting portion 22 of the scanning mirror 14 is reflected toward the sensor 32. The sensor 32 detects the position where the angle detection light L2 strikes, i.e., the position where the angle detection light L2 is received (imaging position). Examples of the sensor 32 include a position sensitive detector (PSD) or an image sensor such as a CCD. The sensor 32 may be capable of one-dimensional position detection, or capable of two-dimensional position detection. In the present embodiment, the sensor 32 serves as a portion of the calculator.

When shape measurement of the work piece W is being executed, the laser light L is divided by the beam splitter 35 into the measurement light L1 and the angle detection light L2. By controlling the rotation angle θ1 of the scanning mirror 14, the measurement light L1 scans the surface of the work piece W and an image thereof is captured by the image capturer 60.

The angle detection light L2 is reflected by the second reflecting portion 22 of the scanning mirror 14 and strikes the sensor 32. Based on results of the position detection performed by the sensor 32, the rotation angle θ1 of the scanning mirror 14 is calculated by the controller 80. Specifically, in the present embodiment, when the measurement light L1 scans the work piece W, the rotation angle θ1 of the scanning mirror 14 is calculated in real-time. As a result, the shape of the work piece W can be measured with a high degree of accuracy based on a captured image of the measurement light L1 and the rotation angle θ1 of the scanning mirror 14.

Moreover, as shown in FIG. 2, in the present embodiment, there is a correspondence between the rotation angle θ1 and the reflection angle θ2 of the scanning mirror 14. Accordingly, calculating the rotation angle θ1 is equivalent to calculating the reflection angle θ2. In addition, measuring the shape of the work piece W using the rotation angle θ1 is equivalent to measuring the shape of the work piece W using the reflection angle θ2.

In the example shown in FIG. 4, the second reflecting portion 22 is provided to the back surface 34 of the scanning mirror 14. Therefore, the rotation angle θ1 of the scanning mirror 14 can be calculated with a high degree of accuracy without affecting firing of the measurement light L1 at the work piece W.

FIG. 5 is a schematic view of another exemplary configuration of an angle calculator. In an angle calculator 40, the first reflecting portion 21 and the second reflecting portion 22 are each provided at different respective positions on a front surface 43 of the scanning mirror 14. Laser light emitted from the laser light source 11 is divided into the measurement light L1 and the angle detection light L2 by a dividing optical system not shown in the drawing.

The measurement light L1 is reflected by the first reflecting portion 21 and scans the surface of the work piece W due to the rotation of the scanning mirror 14. The angle detection light L2 is reflected by the second reflecting portion 22 and is directed at the sensor 42. The photoreception position corresponding to the rotation of the scanning mirror 14 is detected by the sensor 42, and the rotation angle θ1 of the scanning mirror 14 is calculated.

In such a configuration, the rotation angle θ1 of the scanning mirror 14 can be calculated with a high degree of accuracy, and the shape of the work piece W can be measured with a high degree of accuracy. The configuration shown in FIG. 5 is effective, for example, when a double-sided mirror cannot be obtained as the scanning mirror 14, or in a case where the angle detection light L2 cannot be guided onto the back surface 44 of the scanning mirror 14 due to the design of the optical probe. Naturally, the configuration shown in FIG. 5 may be proactively adopted, as well. The angle detection light L2 may be fired at the front surface 43, and therefore the rotation angle θ1 of the scanning mirror 14 can be calculated with a high degree of accuracy using a simple configuration.

In the optical probe 100 according to the present embodiment in the foregoing description, the laser light L from the laser light source 11 is divided into the measurement light L1 and the angle detection light L2, and the measurement light L1 is fired at the work piece W by the galvano-mirror 13. The angle detection light L2 is reflected by the second reflecting portion 22 of the galvano-mirror 13 and is received by the sensor 32. The sensor 32 and the controller 80 calculate the reflection angle θ2 (rotation angle θ1) of the galvano-mirror 13 based on the second divided light L2 received by the sensor 32. By dividing the laser light L emitted from the laser light source 11 for use in this way, the reflection angle θ2 of the galvano-mirror 13 can be calculated with a high degree of accuracy. In addition, because a rotary encoder or the like is unnecessary, a load on the motor 15 can be reduced and high-speed scanning can be performed. Further, the rotational torque required can be kept low, and therefore the motor 15 can be made smaller. As a result, the optical probe 100 can also be made smaller.

An example of a method not employing a rotary encoder is a method in which a motor is rotated at a fixed speed and a rotation angle of a scanning mirror is calculated based on an amount of drive time of the motor. However, in such a method, maintaining a constant, fixed rotation speed is difficult, resulting in frequent variation in the calculated rotation angle. Specifically, calculating the rotation angle (reflection angle) with a high degree of accuracy is difficult in such a method. In contrast, in the present invention, a measurement is made by detecting, using laser light, the actual rotation angle of the motor as an angle of inclination of the mirror. Therefore, the rotation angle (reflection angle)

can be calculated with a high degree of accuracy. Also, the shape of the work piece can be measured with a high degree of accuracy based on the angle information.

FIG. 6 is a schematic view of an exemplary configuration in a case where a dividing optical system is not used. In an angle calculator 50, a laser light source 58 firing the angle detection light L2 is used instead of a dividing optical system. Specifically, two laser light sources are used in this optical probe: a first laser light source 11 firing the measurement light L1, and the second laser light source 58 firing the angle detection light L2. The measurement light L1 is fired at the first reflecting portion 21 provided to the front surface 53 of the scanning mirror 14. The angle detection light L2 is fired at the second reflecting portion 22 provided to the back surface 54 of the scanning mirror 14. The second reflecting portion 22 may also be provided to the front surface 53 of the scanning mirror 14.

The rotation angle of the scanning mirror 14 can be calculated with a high degree of accuracy with this configuration, as well. Because separate laser light sources are used for measurement and angle detection, the measurement light L1 and the angle detection light L2 can each be fired at a desired intensity.

Other Embodiments

The present invention is not limited to the above-described embodiments, and various other embodiments can be used.

In the foregoing, a galvano-mirror was used as a reflecting mirror. The present invention is not limited to this. A resonant mirror performing an inversion movement due to resonance of the mirror may also be used as the reflecting mirror. The resonant mirror utilizes a mechanical resonance phenomenon, and therefore the mirror can be reciprocally moved at a high speed with a simple configuration. When this mirror is used as the scanning mirror, a flying spot-type scanner measuring device can be configured, which is small in size and effective for high-speed scanning.

Even when a resonant mirror of this kind is used, a configuration that includes the above-described angle calculator can be applied, enabling highly accurate shape measurement and a reduction in the size of the device. In addition, because the resonant mirror moves due to mechanical resonance, directly mounting a detection mechanism such as a rotary encoder in order to calculate the rotation angle is difficult. This is because when other components are attached to the scanning mirror or to a crossbeam supporting the scanning mirror, for example, a resonance frequency may change, be reduced (making high-speed scanning impossible), or cease. In contrast, in the present invention, resonance characteristics of the resonant mirror are not affected, and the rotation angle of the scanning mirror can be accurately calculated. As a result, measurement accuracy of triangulation using the rotation angle of the scanning mirror can be improved, enabling highly accurate shape measurement.

In the above, a double-sided mirror was used as the scanning mirror. However, a mirror may also be attached (as the second reflecting portion) to a back surface, which is not a mirror surface. Alternatively, a portion of the back surface may be made to be partially a mirror surface, and that portion may be defined as the second reflecting portion. Even in a case where the second reflecting portion is defined at a different position on the front surface, as shown in FIG. 5, a mirror may be attached to that portion, or that portion may be made to be partially a mirror surface. The configuration of the second reflecting portion is not limited.

Using a dividing optical system, intensities of the measurement light and the angle detection light into which the light is divided may be separately defined. Specifically, the measurement light and the angle detection light may be divided so as to obtain a desired light intensity. For example, using the dividing optical system, the measurement light and the angle detection light may be divided so as to make the intensity of the angle detection light (second divided light) less than that of the measurement light (first divided light). For example, treating the intensity of the laser light emitted from the laser light source as 100%, the measurement light is divided into approximately 80% intensity while the angle detection light is divided into approximately 20% intensity. Other ratios of intensity may be defined as appropriate. By appropriately defining the intensity in this way, image capture of the work piece using the measurement light and accurate calculation of the rotation angle using the angle detection light can both be improved.

In the above, a description was given of an optical probe measuring a shape of a work piece. However, the illumination apparatus according to the present invention, which includes a solid-state light source, a reflecting mirror, an optical system, and a calculator, is not limited to shape measurement and may be used in various apparatuses utilized in other fields such as laser machining or laser printing.

In addition, the first divided light may scan in two dimensions using the reflecting mirror. For example, the scanning mirror, which includes the reflecting mirror, can rotate centered on two axes and the first divided light scans in two dimensions using the scanning mirror. Even with such a configuration, the angle detection light is fired at the second reflecting portion provided on the scanning mirror, and the reflected light is received by the sensor; thereby, the rotation angle (reflection angle) of the scanning mirror can be calculated with a high degree of accuracy. In this case, a device capable of two-dimensional position detection, such as an area sensor, is used as the sensor.

Data for the reflection angle of the reflecting mirror may also be used outside of the shape measurement. For example, the data for the rotation angle of the scanning mirror may also be used to correct operation of the motor, which rotates the scanning mirror.

At least two characteristic features of each embodiment described above may also be combined. In addition, the various effects described above are merely exemplary and are not intended to limit the present invention. Other effects may also be achieved.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An illumination apparatus comprising:
a light source;
a reflecting mirror having a first reflector and a second reflector, the reflecting mirror configured to reflect and direct a first divided light at an object while changing a reflection angle, the first divided light being a portion of light from the light source emitted at the first reflector;
an optical system configured to divide the light from the light source into the first divided light and a second divided light, and further configured to guide the second divided light to the second reflector; and
a calculator configured to calculate the reflection angle of the reflecting mirror by receiving the second divided light reflected by the second reflector.

2. The illumination apparatus according to claim 1, wherein the reflecting mirror is further configured to direct the first divided light at the object in a linear shape.

3. The illumination apparatus according to claim 2, wherein:
the reflecting mirror comprises a rotatable mirror centered on a single axis, and
the calculator is further configured to calculate a rotation angle of the mirror.

4. The illumination apparatus according to claim 1, wherein:
the reflecting mirror comprises a front surface and a back surface, and
the first reflector one the front surface and the second reflector is on the back surface.

5. The illumination apparatus according to claim 1, wherein:
the reflecting mirror comprises a front surface and a back surface, and
the first reflector and the second reflector are provided on different respective positions on the front surface of the reflecting mirror.

6. The illumination apparatus according to claim 1, wherein the optical system is configured to divide the first divided light and second divided light such that the second divided light has a lower intensity than that of the first divided light.

7. The illumination apparatus according to claim 1, wherein the reflecting mirror is one of a galvano-mirror and a resonant mirror.

8. The illumination apparatus according to claim 1, wherein the light source is a laser light source.

9. An illumination method comprising:
dividing light emitted from a light source into a first divided light and a second divided light;
directing the first divided light at a first reflector on a reflecting mirror;
guiding the second divided light to a second reflector on the reflecting mirror;
directing the first divided light at an object by reflecting the first divided light with the first reflector while changing a reflection angle of the reflecting mirror; and
calculating the reflection angle of the reflecting mirror by receiving the second divided light reflected by the second reflector.

10. A measuring apparatus comprising:
a light source;
a reflecting mirror having a first reflector and a second reflector, the reflecting mirror configured to reflect and direct a first divided light at an object while changing a reflection angle, the first divided light being a portion of light from the light source emitted at the first reflector;
an optical system configured to divide the light from the light source into the first divided light and a second divided light, and further configured to guide the second divided light to the second reflector;
a calculator configured to calculate the reflection angle of the reflecting mirror by receiving the second divided light reflected by the second reflector; and
a measurer configured to measure a shape of the object based on an image obtained by capturing an image of the first divided light directed at the object and on the reflection angle calculated by the calculator.

11. A measuring method comprising:
dividing light emitted from a light source into a first divided light and a second divided light;
directing the first divided light at a first reflector on a reflecting mirror;
guiding the second divided light to a second reflector on the reflecting mirror;
directing the first divided light at an object by reflecting the first divided light with the first reflector while changing the reflection angle of the reflecting mirror;
calculating the reflection angle of the reflecting mirror by receiving the second divided light reflected by the second reflector; and
measuring the shape of the object based on an image obtained by capturing an image of the first divided light directed at the object and on the calculated reflection angle.

* * * * *